UNITED STATES PATENT OFFICE.

HENRY ERNEST FRY, OF DORCHESTER, ENGLAND.

MANURE.

1,397,629.     Specification of Letters Patent.     Patented Nov. 22, 1921.

No Drawing.     Application filed March 16, 1921. Serial No. 452,770.

(GRANTED UNDER THE PROVISIONS OF THE ACT OF MARCH 3, 1921, 41 STAT. L., 1313.)

*To all whom it may concern:*

Be it known that I, HENRY ERNEST FRY, a subject of the King of Great Britain, residing at Godmanstone, Dorchester, Dorset, England, have invented new and useful Improvements in and Relating to Manures, (for which I have filed an application in Great Britain Nov. 14, 1919,) of which the following is a specification.

According to this invention I take compounds containing the chemical elements which are essential to plant life and divide them into two groups. The first group consists of compounds containing the elements oxygen, nitrogen, hydrogen, phosphorus and carbon in a predominant degree and the second group consists essentially of salts of the metals potassium, sodium, calcium, magnesium and iron, while the two groups comprise between them all the said elements and metals.

Example I: Household soot, superphosphate of lime (acid calcium phosphate), nitrate of ammonium (ammonium nitrate), sulfate of copper (copper sulfate), in which the amount of soot is larger than the amount of superphosphate or nitrate of ammonia, the amount of the latter being three times greater than the amount of sulfate of copper, and the quantity of soot is never greater than ten times the amount of sulfate of copper.

Preferably such a manure consists of:—

| | Parts. |
|---|---|
| Household soot | 4 |
| Superphosphate of lime | 3 |
| Nitrate of ammonia | 3 |
| Sulfate of copper | 1 |

Example II. Sodium phosphate, household soot, nitrate of ammonia, sulfate of copper, in which the amounts of the three first substances are about eleven times greater than the amount of the sulfate of copper.

Preferably such a manure consists of:—

| | Parts. |
|---|---|
| Sodium phosphate | 5 |
| Household soot | 3 |
| Nitrate of ammonia | 3 |
| Sulfate of copper | 1 |

As examples of manures containing the second group:

Example I. Sulfate of potassium (potassium sulfate), chlorid of sodium (sodium chlorid or common salt), sulfate of magnesium (magnesium sulfate or epsom salt), sulfate of iron (iron sulfate), in which the amounts of the first two substances are about four times greater than the amounts of the last two.

Preferably such a manure consists of:—

| | Parts. |
|---|---|
| Sulfate of potassium | 6 |
| Chlorid of sodium | 2 |
| Sulfate of magnesium | 1 |
| Sulfate of iron | 1 |

Example II. Nitrolim, (crude calcium cyanamid usually containing some free lime and some free carbon), sulfate of potassium (potassium sulfate), sulfate of magnesium, sulfate of iron, in which the amount of sulfate of magnesium is less than the amounts of the first two substances but greater than the amount of sulfate of iron, and the nitrolim or sulfate of potassium never exceeds five times the amount of sulfate of iron, and preferably such a manure consists of:—

| | Parts. |
|---|---|
| Nitrolime | 4 |
| Sulfate of potassium | 5 |
| Sulfate of magnesium | 2 |
| Sulfate of iron | 1 |

In manufacturing my improved manure, I take a mixture containing members of the first group in a predominant degree and use it in conjunction with a separate mixture containing members of the second group in a predominant degree but I apply the first said mixture to the ground beneath the plant or seed while the second said mixture is applied as a top dressing. In selecting the members of the group care is taken that all the essential elements mentioned are contained in one or other of the mixtures.

I claim as my invention:—

1. A complete manure comprising two separated portions, one of said portions containing a preponderating proportion of the elements carbon, oxygen, nitrogen, hydrogen, and phosphorus in a form available as plant food, such portion adapted to be placed at a substantial depth in the soil; and the other of said portions containing a preponderating proportion of compounds of the elements potassium, sodium, calcium, magnesium and iron in a form available as plant food, such latter portion adapted for use as a top dressing, and such two portions being adapted for application to the same body of soil, at the different levels stated.

2. A composite manure comprising two separated portions, one of such portions containing a preponderating proportion of non-metallic elements which possess fertilizing properties, such portion adapted to be placed at a substantial depth in the soil; and the other of such portions containing a preponderating proportion of compounds of metallic elements which possess fertilizing properties, such latter portion being adapted for use as a top dressing, and such two portions being adapted for application to the same body of soil at the different levels stated.

3. A method of treating vegetable growth in soil, which comprises applying to the soil at below the vegetable growth being treated, a portion of a manure containing preponderating proportions of the elements carbon, oxygen, nitrogen, hydrogen and phosphorus in a form available as plant food, and applying as a top dressing to the soil containing such vegetable growth, a manure containing a preponderating proportion of compounds of the elements potassium, sodium, calcium, magnesium, and iron in a form available as plant food.

4. The hereinafter described method of treating vegetable growth in soil, which comprises applying to the soil, at below the vegetable growth, a solid portion of fertilizing material containing preponderate amounts of non-metallic elements which possess fertilizing properties, and applying as a top dressing to the soil in the vicinity of such vegetable growth, a solid portion of a fertilizing material containing preponderating amounts of compounds of metallic elements which possess fertilizing properties.

5. A process which comprises supplying to soil carrying vegetable growth, at below the said vegetable growth, fertilizing material comprising soot, an available phosphate, a soluble nitrogenous compound having fertilizing properties, and a sulfate, at least one of such materials containing combined hydrogen; and supplying to the top of the soil carrying such vegetable growth, a fertilizing material containing soluble compounds of potassium, magnesium and iron, available as plant food, and also supplying sodium and calcium, in a form available as plant food, to said soil.

6. The herein described product comprising earth carrying vegetable growth, a fertilizing material placed below the said vegetable growth and containing carbon, oxygen, nitrogen, sulfur and phosphorus in form available as plant nutrition, and a fertilizer material placed upon said earth, such material comprising salts of potassium, magnesium and iron in a form available as plant nutrition, such earth also being associated with calcium and sodium compounds.

7. A process of treating vegetable growth in soil, which comprises applying to the soil at below the said vegetable growth, a portion of a fertilizer material in which non-metallic elements predominate, and applying as a top dressing to the said soil, a separate portion of a fertilizer material in which compounds of metals predominate, the said two portions of fertilizer material, collectively containing all of the elements O, N, H, P, C, K, Na, Ca, Mg, and Fe, the said elements being in form available as plant food.

In testimony that I claim the foregoing as my invention I have signed my name this 21st day of February, 1921.

HENRY ERNEST FRY.